(12) United States Patent
Dolbakian et al.

(10) Patent No.: US 9,104,886 B1
(45) Date of Patent: Aug. 11, 2015

(54) AUTOMATED PRIVACY CONTROL

(71) Applicant: Amazon Technologies, Inc., Reno, NV (US)

(72) Inventors: Levon Dolbakian, Los Gatos, CA (US); Jonathan White Keljo, Seattle, CA (US); Kenneth Paul Kiraly, Menlo Park, CA (US); Nadim Awad, San Francisco, CA (US); Arnaud Marie Froment, San Jose, CA (US); Michael David Dumont, Sunnyvale, CA (US); Srinivasan Sridharan, Sunnyvale, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 23 days.

(21) Appl. No.: 13/928,265

(22) Filed: Jun. 26, 2013

(51) Int. Cl.
*G06F 21/84* (2013.01)
*G06F 21/62* (2013.01)

(52) U.S. Cl.
CPC ..................... *G06F 21/62* (2013.01)

(58) Field of Classification Search
CPC ................. G06F 11/0742; G06F 17/30699
See application file for complete search history.

(56) References Cited

PUBLICATIONS

Privacy control in smart phones using semantically rich reasoning and context modeling. IEEE CS Security and Privacy Workshops(2012).*
A Location-Aware Guide Based on Active RFIDs in Multi-Device Environments. Ghiani et al. Computer-Aided Design of User Interfaces VI(2009).*
A survey on privacy in mobile participatory sensing applications. Christin et al. The Journal of Systems and Software(2011).*
Acoustic and Visual Signal based Context Awareness System for Mobile Application. Choi et al. IEEE(2011).*
Extensible architecture for context-aware mobile web applications. Espada et al. Elsevier(2012).*
Preserving Privacy in Context-Aware Systems. Jagtap et al. IEEE(2011).*
Mobile Context Toolbox—An Extensible Conext Framework for S60 Mobile Phone. Larsen et al. LNCS(2009).*

* cited by examiner

*Primary Examiner* — Venkat Perungavoor
(74) *Attorney, Agent, or Firm* — Novak Druce Connolly Bove + Quigg LLP (57) ABSTRACT

Systems and approaches are provided for automating privacy control for a computing device based on a privacy or security context of the device. The privacy or security context of the computing device can be determined by analyzing sensor data or other input data captured by the device. The sensor and other input data can provide information such as a location of the computing device or the presence of other persons within the vicinity of the device to indicate whether the user is situated within a private or secure setting or a public or unsecure setting. A privacy or security control can be updated based on the determined privacy or security context, such as modifying a manner of displaying a pin or password during entry, elements of a home screen of the computing device, or preview content of user applications.

22 Claims, 5 Drawing Sheets

AUTOMATED PRIVACY CONTROL

BACKGROUND

As personal computing devices, such as laptop computers, tablets, smartphones, or head-mounted displays and other wearable computing devices (e.g., eyeglasses, visors, gloves, watches, wristbands, etc.) become more sophisticated, users are able to interact with such devices in new and interesting ways. For example, a user may operate a personal computing device to review email, text messages, or instant messages; perform transactions via bank, credit card, and other financial accounts; or create and edit word processing, spreadsheet, and presentation documents. The data associated with such tasks can often be highly sensitive and/or confidential, and securing the data is increasingly important for many personal computing device users. Although the portability and flexibility of personal computing devices are characteristics that are valued by users, such features can also leave sensitive and/or confidential information more vulnerable to exposure by users misplacing their devices or inadvertently revealing the information to others while operating the devices in public or unsecure settings. To secure personal computing devices, a "one size fits all" approach is often taken that typically requires users to enter a pin or password to unlock devices and an additional pin or password entry for access to certain user applications and/or certain data accessible from the devices. In some situations, such as when a user is at home or in the office, requiring multiple pin or password entries can seem onerous when the user is in a private or secure environment. In other situations, pin or password entry may not provide sufficient privacy or security for certain kinds of data.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches for providing privacy or security for a personal computing device. In particular, various embodiments can determine a privacy or security context in which a user and her computing device is situated and configure a privacy or security control based on the privacy or security context and/or the nature of the data the user is attempting to access on the computing device. A personal computing device can operate according to multiple privacy or security contexts that are adaptive to the user's environment and/or the sensitivity of the data being accessed on the device. For example, when a user attempts to access the device or certain data accessible from the device at home or another private or secure setting, the device can be configured to display a pin or password to the user in order to ease entry of the pin or password or the device may enable immediate access to the device, user applications, or data without pin or password entry altogether in certain instances. When the user attempts to access the device or certain data accessible from the device at a public or unsecure setting, the device can obscure the pin or password during entry by displaying an asterisk for each key entered into the device. In some embodiments, a user may categorize some data as requiring additional privacy or security control and access to such data may be enabled using a different privacy or security authentication approach, such as techniques based on biometrics (e.g., facial recognition, fingerprint scanning, or retinal scanning), behaviometrics (e.g., voice or gait recognition), and/or other privacy or security approaches.

In various embodiments, data captured by one or more sensors, input devices, and other inputs of a computing device can be analyzed to determine the privacy or security context of the environment in which the device is located and a confidence level associated with the determined privacy or security context. The privacy or security context can be represented as a binary state (e.g., "public" or "private"), multiple states (e.g., "personally private", "confidential business", "highly confidential business", etc.), a range of states (e.g., "public", "semi-public", "private", "maximally secure", etc.), or other such designations. The privacy or security context indicates an extent to which the environment in which the computing device is situated is private/secure or not. In some embodiments, a user's home, office, or other location may generally be determined to be a private or secure environment. This can be based on explicit user configuration, bright-line rules or heuristics, or past user behavior of a specific user or a community of users. For example, a user's recurring access of sensitive data at a particular place can indicate that the location is private or secure. In some embodiments, the computing device can prompt the user whether to configure a current location as a private or secure environment when the user accesses confidential or sensitive at that location a specified number of times. Henceforth, that location may be determined to correspond to a private or secure setting if the user selects the location to be a private or secure location for the user. However, certain conditions, as determined by a device's sensors or other inputs, can affect that determination. For instance, the presence of persons other than the device's owner within the vicinity of the device, such as detected by a camera or a microphone, may change the determined privacy or security context of the device from private/secure to a less private/secure state in some situations. The confidence level can be used to quantify an extent of certainty of the determined privacy or security context, and can be based on input device sensitivity, accuracy, or specificity, an error rate associated with the sensor or input, receiver operating characteristic (ROC) of the sensor or input, and other such metrics. For example, when a global positioning system (GPS) receiver of a computing device indicates that the user is located at a park, the environmental state associated with this location may be "public" with a high level of confidence, such as 100 in a numeric range of 0 to 100, for the determined privacy or security context. In another situation, the GPS receiver may indicate that the user is located proximate to the user's home such that the privacy or security context is determined to be "private" but not directly inside the user's home (e.g., front yard or backyard). The GPS receiver, however, may only be accurate up to a dozen meters, and a lower confidence level, such as 50, may be associated with the determined privacy or security context because of the uncertainty of whether the user is inside or outside of her home.

In various embodiments, data from multiple sensors of the computing device or other inputs can be selected and/or aggregated to obtain a more accurate and/or detailed understanding of the privacy or security context of the environment in which the device can be found. In some embodiments, a determination by one sensor, input device, or other input can be selected from multiple inputs to determine a final privacy or security context. Selection may be based on a particular input being associated with a highest confidence level or lowest error rate. In other embodiments, the data captured by multiple sensors or other inputs can be combined by weighting each input based on various factors, such as an extent to which data from a particular sensor or input can be relied upon to determine the privacy or security context of a device. For instance, in one embodiment, a microphone can be used to capture ambient noise to analyze whether there are other persons within the vicinity of the device. Ambient noise revealing that other persons are speaking close to the device may be a strong indicator that the device is within a public setting, and lack of ambient noise may lean slightly in favor of the device being designated as within a private setting. The device may also include a GPS receiver that can be used to determine the privacy or security context of the device. An approach relying on geolocation data for determining an privacy or security context of a device may be more reliable than an approach based on ambient noise, and the approach using GPS or geolocation can be weighted more strongly than the approach determined using a microphone or ambient noise. In still other embodiments, only a selection of the sensors and other inputs can be aggregated to arrive at the final determined privacy or security context of the device.

In various embodiments, privacy and security controls can be updated based on a determined privacy or security context of a computing device. For example, a period of time of inactivity that triggers a screen lock or screen saver may vary according to the privacy or security context of the device, certain data (e.g., applications, documents, photographs, media files, preview content, etc.) may be displayed or hidden based on the determined privacy or security context, and/or user interfaces may be modified according to the privacy or security context of the device.

Various other functions and advantages are described and suggested below in accordance with the various embodiments.

Figure 1A:
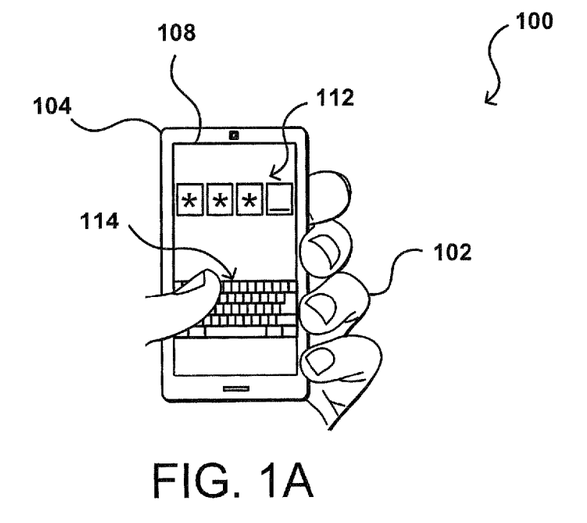
FIGS. 1A and 1B illustrate examples of a personal computing device configured with privacy or security controls adaptive to the device's privacy or security context in accordance with an embodiment.
Figure 1B:
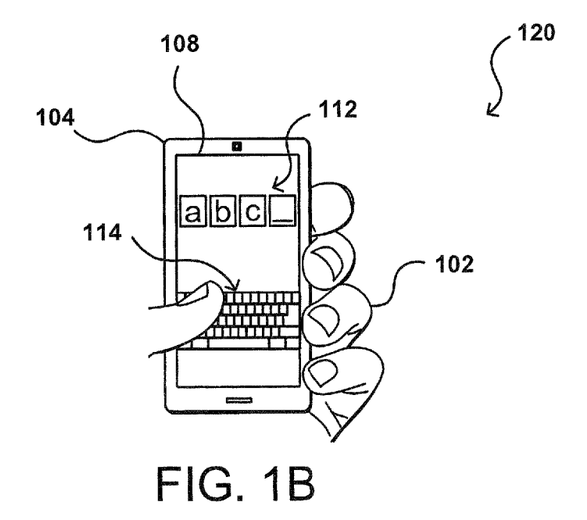

FIGS. 1A and 1B illustrate a user 102 operating a computing device 104 capable of determining the privacy or security context of the device and configuring an applicable privacy or security control based on the determined privacy or security context. Although a portable computing device (e.g., a smart phone, tablet, or portable media player) is shown that can be held in a user's hand, it should be understood that other types of computing devices can utilize aspects of the various embodiments as should be apparent in light of the teachings and suggestions contained herein. In the example situation 100 of FIG. 1A, the computing device 104 includes a display screen 108 at the front of the device. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. The display screen 108 is a touchscreen comprising a plurality of capacitive touch sensors and capable of detecting the user's fingertip touching points of the screen as input for the device. In other embodiments, the display element may implement a different touch technology (e.g. resistive, optical, ultrasonic) or may not be capable of detecting a user's touch at all.

In the example situation 100, the computing device 104 has been locked because of a period of inactivity when the user 102 attempts to access the device. The device 104 includes one or more additional sensors, other input devices, or other inputs (not shown) that are used to determine the current location of the device, such as a GPS receiver, a cellular phone network component, a near-field communications (NFC) component, other short-range beacon systems based on Wi-Fi, radio frequency (RF), infra-red (IR), Bluetooth®, and other such approaches known to those of ordinary skill in the art for determining location. In certain embodiments, image data can be captured using a camera of a device and the captured image data can be matched against an image database to recognize a user's current specific location or a type of location of the user's current location. For example, the device (or the device in communication with another system) may analyze the captured image data and recognize that the user is located at a grocery store based on a plurality of stock shelves within the captured image data. Further, when captured image data includes textual information, such as a street or building sign, the textual information can be recognized using one or more optical character recognition (OCR) engines and the recognized textual information can be used to determine the location. In this example, the location of the device 104 is determined to be a public setting, such as away from a user's home, office, or other secure environment or a location that may include persons, other than the user, within the vicinity of the device. Based on the determination of a public setting and the user's attempt to unlock the device, the device prompts the user to enter a pin or password 112 via a virtual keyboard 114 presented on the touchscreen 108 before the user can access the device operating system and user applications. As the user enters the pin or password 112, each key of the pin or password is obscured from view of potential passersby by replacing the key with an asterisk. In other embodiments, a most recently entered key may be displayed for a brief period of time to assist the user with pin or password entry before being obscured by an asterisk.

FIG. 1B illustrates an example situation 120 in which the sensors or other input elements (not shown) of the computing device 104 are used to determine that the device is located in a private or secure setting, such as the user's home, office, or other location designated as secure or a location that is determined to be unlikely to have other persons, other than the user, within the vicinity of the device. Similar to the example situation 100 of FIG. 1A, in this example 120, the user 102 has not interacted with the device 104 for a period of time such that a screen lock or screensaver has been triggered when the user attempts to access the device. Upon attempting access to the device 104, the device prompts the user to enter a pin or password 112 via the virtual keyboard 114. In this example, however, each key is displayed to the user as the user enters the pin or password into the device because the privacy or security context is determined to be a private or secure setting. Text entry can sometimes be difficult for users of personal computing device because users' fingers are typically larger than virtual keys. A user may enter an unintended key without realizing it, which will result in entry of an incorrect pin or password and the user remaining locked out of their devices. Displaying each key of the pin or password as each key is entered during entry can assist correct key input without compromising the security of the device when the user is determined to be within a private or secure setting. In other embodiments, only a portion of the pin or password may be displayed at a time, such as one or more of the keys most recently entered and the remaining portion of the pin or password may be obscured.

Although a pin or password entry is disclosed as one approach for securing a personal computing device, it will be appreciated that other privacy or security techniques can be used to secure a device in various other embodiments. For example, in one embodiment, a device may include one or more inertial sensors, such as an accelerometer, gyroscope, inclinometer, or magnetometer, which can be used to detect a particular series of device motions (e.g., panning, tilting, dollying in, dollying out) to unlock the device and/or enable access to certain data accessible from the device. In another embodiment, a device may include one or more cameras that can be used to detect various user gestures (e.g., eye winks, lip movements, head movements, finger or hand gestures, etc.). In another embodiment, biometric characteristics (e.g., facial recognition, retinal or fingerprint scanning) or behaviometric characteristics (e.g., written signature) can be measured and used to unlock the device and/or enable access to certain data accessible from the device. As used herein, biometrics refers to approaches that measure and analyze biological characteristics of a user for authentication purposes while behaviometrics refers to approaches that measure and analyze how a user behaves to identify a specific user. For example, biometric techniques may capture fingerprint, retinal, or DNA data to identify a specific user while behaviometric techniques can be used to identify a user by the way she signs her name, how she pronounces or mispronounces words of a non-native language, or the way she walks and/or runs. In yet another embodiment, a device may include one or more touch or pressure sensors that can be used to detect one or more touch or squeeze gestures to unlock the device and/or enable access to certain data accessible from the device. It will be appreciated to those of ordinary skill in the art that a pin or password entry via a virtual keyboard is a specific instance of an approach based on touch gestures, and that other embodiments may employ a privacy or security control based on other types of touch or squeeze gestures (e.g., user signature via a pointer such as user's finger, stylus, or similar implement). In other embodiments, spoken words, phrases, or other sounds captured using one or more microphones can be used to unlock the device and/or enable access to certain data accessible from the device. As mentioned, in still other embodiments, users can obtain immediate access to a device or certain data accessible from the device without any authentication when the device is determined to be located at a private or secure environment.

Systems and approaches in accordance with various embodiments are able to determine a privacy or security context of a computing device using various sensors or other input mechanisms of the device and configuring a privacy or security control based on the determined privacy or security context. In various embodiments, a computing device may include one or more cameras, microphones, GPS receivers, cellular network transceivers, Wi-Fi transceivers, Bluetooth® devices, RF transceivers, NFC devices, proximity sensors, distance sensors, depth sensors, ambient light sensors, barometers, altimeters, accelerometers, magnetometers, gyroscopes, inclinometers, thermal sensors, touch sensors, pressure sensors, optical sensors, infra-red transceivers, laser transceivers, ultrasonic transceivers, and/or other sensors, transceivers, and mechanisms that can be used to determine the user's environment and/or whether other persons, other than the user, are within the vicinity of the device.

Figure 2:
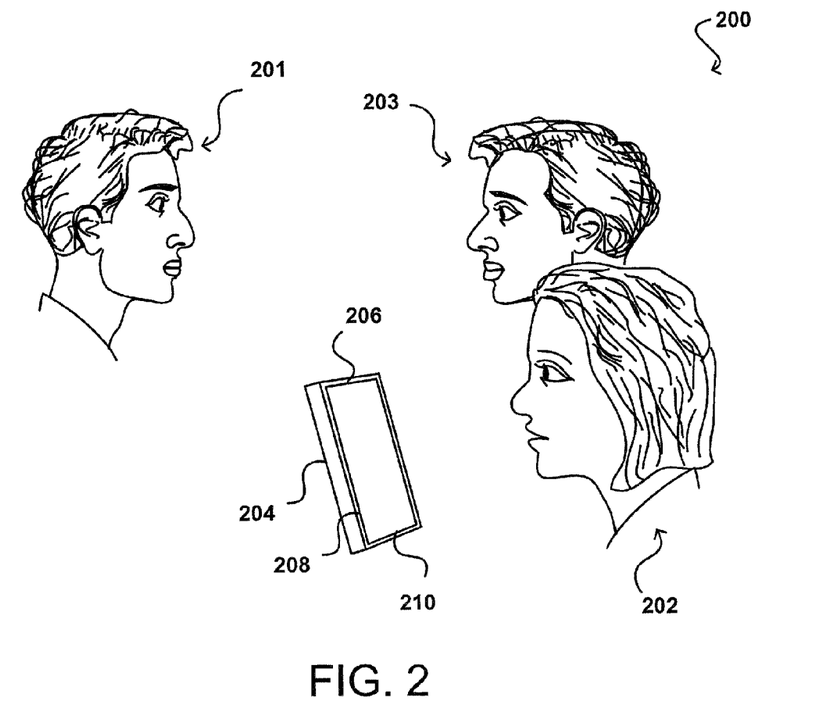
FIG. 2 illustrates an approach to determine a privacy or security context of a personal computing device in accordance with an embodiment.

FIG. 2 illustrates an example approach 200 for determining a privacy or security context of a computing device 204. In this example, the computing device 204 includes a camera 206 positioned on the front of the device such that at least a portion of a user operating the computing device 204 is captured by camera 206. In some embodiments, a computing device may also include one or more cameras on the back (and/or sides) of the device capable of capturing image data in front (and/or to the top, bottom, or side) of the user when the user is operating the computing device. In this example, camera 206 comprises a digital camera incorporating a CMOS image sensor. In other embodiments, a camera of a device can incorporate other types of image sensors (such as a charged couple device (CCD)) and/or can include multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors. The example device 204 also includes a display screen 208 at the front of the device, on a same surface as the camera 206.

The computing device 204 also includes one or more microphones 210 or other audio capture devices capable of capturing audio data, such as words spoken by a user of the device or ambient sound in the vicinity of the device. In this example, the microphone 210 is placed on the same side of the device 204 as the display screen 208, such that the microphone 210 will typically be better able to capture words spoken by a user of the device. In at least some embodiments, the microphone can be a directional microphone that captures sound information from substantially directly in front of the device, and picks up only a limited amount of sound from other directions, which can help to better capture words spoken by a primary user of the device. In other embodiments, a computing device may include multiple microphones to capture 3D audio. In at least some embodiments, a computing device can also include an audio output element, such as internal speakers or one or more ports to support peripheral audio output devices, such as headphones or loudspeakers.

In this example, a user 202 of the computing device 204 can be seen attempting to operate the computing device 204 within the vicinity of persons 201 and 203 having no relation to user 202. Upon attempting to access the device, the device may capture input data from the plurality of input mechanisms of the device to determine the privacy or security context of the device's environment in order to apply appropriate privacy or security controls. A GPS receiver (not shown) of the device 204 can determine GPS coordinates corresponding to the location at which the device is located, and the device can request a reverse geocoding from a remote mapping service to retrieve a geographical address or similar location data for the device. In this example, the geographical address at which the device is located is determined to be an outdoor café frequented by the user 202. The device may also capture image data using the front-facing camera 206 to determine the number of persons represented within the image data, such as by facial recognition, pupil recognition, or similar processes. For example, persons within the field of view of the camera 206 are likely to be capable of viewing content displayed on the touchscreen 208. The presence of multiple persons may be a strong indicator that the device is located within a public or unsecure setting. In this example, a facial recognition process is used to analyze the captured image data and identifies the presence of multiple persons, user 202 and another person 203. As mentioned, in at least some embodiments, a device may be capable of recognizing the specific user of the device based on facial recognition or retinal scanning, and the privacy or security context of the device can be further based on such analysis. For instance, a person other than a user of a device represented within captured image data may strongly imply that the device is located within a public or unsecure setting.

The computing device 204 can also capture audio data using the microphone 210, and analyze the audio data to determine the privacy or security context of the device. For example, a voice recognition process can be used to determine the number of persons represented within the audio data. Multiple persons speaking may suggest a public setting and lack of ambient noise may suggest that the current environment of the device is more likely to be a private setting. In this example, little to no ambient noise is captured by the microphone 210. The computing device 204 further includes an ambient light sensor (ALS) (not shown) that can also be utilized for determining the privacy or security context of the computing device. For instance, the amount of ambient light detected by the ALS in combination with a time between sunrise and sunset can determine whether the user is likely to be indoors, which may correspond to the privacy or security context that is more likely to be a private setting, or outdoors, which may correspond to the privacy or security context that is more likely to be a public setting.

In various embodiments, sensor data or other input data can be aggregated to determine a privacy or security context of a computing device. In one embodiment, respective data from each of a plurality of sensors or other input mechanisms can be analyzed to determine a preliminary score indicative of a privacy or security context according to a sensor or input mechanism. Each preliminary score may be weighted according to factors such as sensor or input mechanism accuracy, an extent to which a sensor or input may be a more reliable indicator of the privacy or security context of the device, environmental conditions affecting the sensor or input, an amount of historical user data (for a specific user of a device and/or a community of users) accumulated for a sensor or input, and other such considerations. In some embodiments, one of the preliminary scores can be selected to be the final determined privacy or security context of the environment in which the user and/or computing device is situated. In other embodiments, the preliminary scores can be aggregated to determine a composite score representing the privacy or security context and a confidence level of the determined privacy or security context. An example of an approach for determining a privacy or security context of a computing device is provided in Table 1.

In Table 1, the first column represents each of the sensors or inputs used by a computing device to determine the privacy or security context of the device. In this example, the ALS Daytime (Clear Day), ALS Daytime (Cloudy Day), and ALS Nighttime inputs are mutually exclusive. That is, only one of these inputs will be evaluated to determine the final or composite privacy or security context as only one of these time and weather conditions will be applicable. The second column represents the weight w each sensor or input of the computing device should be afforded in determining the privacy or security context of the computing device. Weighting here is based on the efficacy of each input approach in determining the privacy or security context for a particular user, although various other weighting schemes can be used and which are discussed elsewhere herein. In this example, each of the ALS inputs is also designated different weights because the accuracy and/or reliability of the ALS may depend on cloud conditions and/or time of day. The ALS sensor may not be capable of providing relevant data after sunset, such that the weight of "ALS Nighttime" is 0.0. Further, the ALS may be less accurate under conditions less than full sunlight such that the weight on a cloudy day is 0.2 while the weight on a clear day is 0.3. The third column represents the maximum weighted score $s_m$ of each sensor or input (i.e., $s_m = w \times 100$). The fifth column represents the preliminary privacy or security context c as determined individually by each sensor or input. In this example, privacy or security context c is quantified as −1 for a public setting and +1 for a private setting. The fourth column represents the score or confidence level s of the privacy or security context determined by each input approach. The sixth column represents the weighted score $s_w$ for each sensor or input, and can be determined by:

$$s_w = w \times s \times c$$

In this example, scores can range from 0 (lowest level of confidence) to 100 (highest level of confidence).

Returning to example situation 200, the GPS receiver of computing device 204 and the reverse geocoding determined that the user 202 was located at an outdoor café. In one embodiment locations such as the user's home or office can be specified as a private or secure setting and can be scored 100. In other embodiments, a location can correspond to a private or secure environment based on historical user behavior, such as whether the user or similar users have accessed sensitive data at the location on a recurring basis. In this example, although a café is generally a public setting, the user 204 and/or a community of other users may have previously accessed confidential data at the café such that the privacy or security context as determined by the GPS receiver is a public setting, but with a score of 60 out of 100 to reflect the ambiguity of whether the café is a private or public setting. As mentioned, the confidence level or scoring can also be affected by the sensitivity, accuracy, or specificity of a sensor, input mechanism, or other input data, the error rate of the sensor or input, ROC curves of the sensor or input, and other such factors. In this example, the image data captured by the camera 206 indicates the presence of multiple persons represented in the image data such that the privacy or security context of the device as determined by the camera is a public setting. Although the presence of multiple persons is a strong indication that the device is located within a public setting, there may be false positives such as when a single user is located in front of a framed picture or the process used to detect the number of persons represented in the captured image data has been established to be accurate only to a certain degree. Thus, the score for the privacy or security context as determined by the camera 206 is 80 out of 100. In some embodiments, the score can be based on a bright-line rule that detection of multiple users in image data will always return such a score. In other embodiments, the score alternatively or additionally may be affected by an error rate, ROC curves, and other such measurements associated with the facial detection, person detection, or object detection algorithm used to determine the presence of persons in image data.

In this example, the device 204 has also retrieved cloud conditions from a remote weather service and determined that it is a clear day. The ALS of the device 204 captures an amount of ambient light at the user's current location, and the device determines that the privacy or security context is a public setting based on the amount of ambient light detected as compared to the expected outdoor ambient light. As known by those of ordinary skill in the art, indoor lighting can have specular characteristics similar to sunlight. Further, whether a user is indoors or outdoors is not a strong predictor that a particular environment is sufficiently secure. Thus, the score for the privacy or security context as determined by the ALS is 50 out of 100. Again, this can be a bright-line rule or heuristic because mining behavior data of the specific user or a collection of users with similar demographic traits has shown such an approach to be reliable only half the time in determining a privacy or security context for a device. Further, as in this example, the score for one input can also depend on other input data. For example, the score associated with the ALS is based on the weather conditions derived from a remote weather service. The score for the ALS additionally or alternatively may also be affected by a probability rate associated with the weather conditions provided by the weather service, the error rate, accuracy, specificity, ROC curves, etc. of the ALS.

Table 1 includes a Total Score $S_w$, which represents the sum of the weighted scores $s_w$ for each of the sensors or inputs of the device. Weights can be distributed in various ways. In this example, weights have been distributed according to an established efficacy or accuracy of an input approach in determining a privacy or security context of a computing device for a particular user. In other embodiments, weighting may also be based on user behavior data provided by multiple users. In various embodiments, weighting may also or alternatively be based on the determined confidence level of each input approach, the established accuracy of each approach, location, specific input data, and/or other weighting schemes known to those of ordinary skill in the art. Examples of location-based weighting include weighting certain input approaches based on a determined location of a user and/or computing device. For instance, the user may be at a location that typically has little ambient noise, such as a library or place of worship. In such situations, determination of a security or privacy context by microphones may be weighted less than other approaches. As another example, an environmental state of the computing device can also be used for weighting the various input approaches used to determine the privacy or security context of the device. When a user is outdoors, time of day and/or weather conditions may affect the weighting of a determination of the privacy or security context by an ALS, such as sunny conditions during daylight hours corresponding to a greater weight or cloudy conditions and/or night-time hours corresponding to less weight for the ALS. Further, when a user is indoors, an approach based on ALS may be weighted less than other input approaches. Other examples can include input data from a geocoding service, mapping service, calendar/event/scheduling application, and other services and applications.

In this example, a positive Total Environmental Score S indicates a private setting and a negative Total Environmental Score S indicates a public setting. Here, the Total Environmental Score S is −61, suggesting that the device is located within a public setting. Table 1 further includes a Total Max Weighted Score $S_m$, which is the sum of the maximum weighted scores $s_m$ of each of the sensors or inputs of the device. The Total Max Weighted Score $S_m$ can be used to calculate the confidence level of the determined privacy or security context, which is the percentage of the weighted scores compared to the maximum weighted scores:

$$\text{Confidence Level} = \frac{\sum S_w}{\sum S_m} = \left|\frac{S_w}{S_m}\right|$$

In this example, the confidence level is determined to be 44%

$$\left(i.e., \frac{61}{140}\right).$$

TABLE 1

Example Privacy Context Matrix

| Input | Weight (w) | Max Weighted Score ($s_m$) | Score (s) | Privacy Context (c) | Weighted Score ($s_w$) |
|---|---|---|---|---|---|
| GPS | 0.5 | 50 | 60 | Public (−) | −30 |
| Camera(s) | 0.4 | 40 | 80 | Public (−) | −32 |
| Microphone(s) | 0.2 | 20 | 80 | Private (+) | +16 |
| ALS Daytime (Clear Day) | 0.3 | 30 | 50 | Public (−) | −15 |
| ALS Daytime (Cloudy Day) | 0.2 | N/A | N/A | N/A | N/A |
| ALS Nighttime | 0.0 | N/A | N/A | N/A | N/A |
| Total Max Weighted Score ($S_m$) | | 140 | | | |
| Total Score ($S_w$) | | | | | −61 |

It will be appreciated that privacy context matrix of Table 1 is but one approach for aggregating data from multiple sensors or other inputs to determine a privacy or security context of a computing device. It should also be understand that the weights, maximum weighted scores, scores, privacy or security contexts, and weighted scores are provided for explanatory purposes, and the invention disclosed herein is not limited to these particular values. In various embodiments, different weighting schemes, scores, etc., may be used (or not used), including rule-based approaches, classification-based approaches, or estimation-based approaches. Rule-based approaches can include a variety of basic rules, such as a sum rule, a product rule, a maximum rule, a minimum rule, a mean rule, a median rule, a majority voting, among others. In the example of Table 1, a sum rule is used to determine the privacy or security context. A product rule would multiply the scores of each input approach. The sum and product rules can also be weighted, as in the approach set forth in Table 1. In the maximum rule, a determination of a privacy or security context by a single input approach is selected as a final privacy or a security context. The maximum rule can be based on the input approach determined to have the highest confidence level. In the minimum rule, the determination of a single input approach is selected based on a minimum determinant, such as the input approach having the lowest error rate. The mean and median rules take an average of the input approaches, and can use various weighting schemes as discussed throughout herein. The majority voting rule provides a "vote" to each input approach, and the majority of the "votes" is used to determine the final privacy or security context. Majority voting approaches can also use weighting schemes to emphasize or de-emphasize certain input approaches. In some embodiments, determination of a privacy or security context is treated as a classification problem. Classification approaches can be based on support vector machines, Bayesian inference, Dempster-Shafer theory, hidden Markov models, neural networks, and maximum entropy models. Estimation-based approaches can include the Kalman filter or its variants, such as the extended Kalman filter or the unscented Kalman filter, and the particle filter. Such approaches are known to those of ordinary skill in the art and will not be discussed herein in detail. Further, as mentioned, other embodiments may recognize a range of privacy or security contexts. For example, in one embodiment, there may be 5 privacy or security contexts and individual scores of sensors and inputs can correspond to one of the five contexts. The individual scores can be weighted according to some of the considerations discussed herein, and a total score can be calculated from the individual scores. A total score between 0-20 may correspond to the first privacy or security context, a total score between 21-40 may correspond to the second context, a total score between 41-60 may correspond to the third context, a total score between 61-80 may correspond to the fourth context, and a total score between 81-100 may correspond to the fifth context. In other embodiments, weights and individual scoring of sensors and other inputs may be dynamic and can change based on user behavior, including both a specific user of a computing device and a community of users, such as users sharing similar demographic traits or living in close proximity to the specific user. It will be appreciated that other scoring schemes can be utilized by various embodiments as should be apparent in light of the teachings and suggestions contained herein. In at least some embodiments, a device may enable a user to configure or specify the number and types of privacy or security context capable of being determined by the computing device, locations associated with certain contexts, the sensors or other input used to determine the environmental state, weighting, and the security or privacy controls corresponding to certain contexts.

Figure 3:
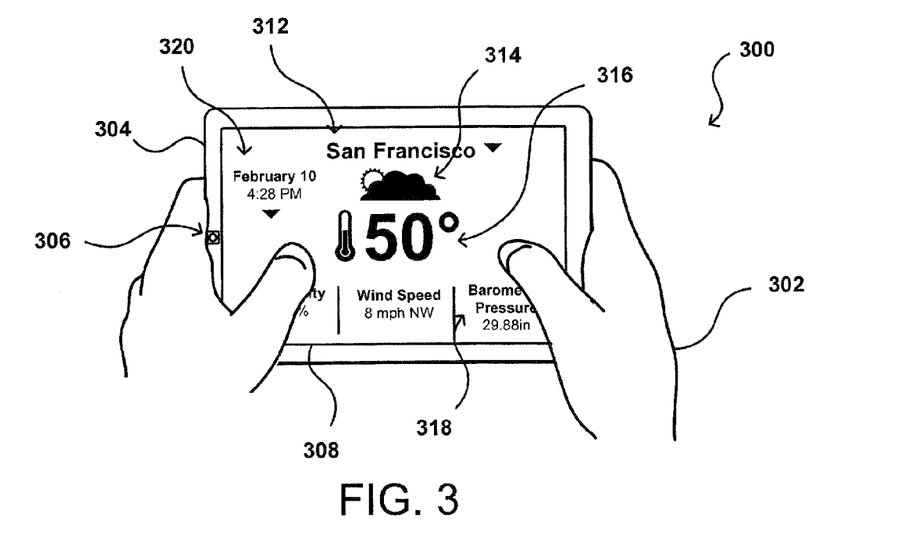
FIG. 3 illustrates an approach to determine a privacy or security context of a personal computing device in accordance with an embodiment.

FIG. 3 illustrates another example approach 300 for determining a privacy or security context of a computing device 304. In this example, the device 304 includes an ALS 306, a thermal sensor (not shown), and a barometer (not shown). The device 304 also includes a touchscreen 308 which is displaying content from a remote weather service. Weather services typically provide information such as temperature 316, cloud conditions 314, wind conditions, and humidity for a specified location 314 and a specified time and day 320. Certain weather services also provide information such as dew point (not shown), wind chill (not shown), UV index (not shown), and barometric pressure 318. In this example, device 304 retrieves the temperature 316, cloud conditions 314, and barometric pressure 318 from the weather service to determine the privacy or security context of the device. As mentioned, the cloud conditions 314 can provide additional information regarding the accuracy of the ALS and the weighting and/or scoring for the ALS may be contingent on the cloud conditions. The temperature provided by the weather service can be used to compare against the temperature captured by the device's thermal sensor to indicate whether user 302 is indoors and more likely to be in a private setting or outdoors and more likely to be in a public setting. For example, indoor room temperature is typically 68° F. to 72° F. A temperature detected by the thermal sensor that is closer to the temperature obtained from the weather service than indoor room temperature may be an indication that the user is outdoors. If the temperature obtained from the weather service is close to room temperature, the data from the thermal sensor can be given little to no weight in determining the privacy or security context of the device. The barometric pressure provided by the weather service can be used to compare against the barometric pressure detected by the device's barometer. A detected barometric pressure that is lower than a barometric pressure obtained from the weather service may indicate that the user is at an elevated location, such as a multi-story building, and more likely to be indoors.

In addition to obtaining data from a remote weather service, the computing device 304 may also obtain other inputs to facilitate determination of the privacy or security context of the device, such as reverse geocoding information from a mapping service, location information from an image-based and/or text-based search engine, or location information from a reverse Internet Protocol (IP) lookup service. In some embodiments, the privacy or security context of the device can be determined in part by the cellular network tower or Wi-Fi connection accessed by the device. For example, the device being connected to a home or business Wi-Fi connection may be a strong indication that the device is situated in a private or secure setting and the device being connected to a public Wi-Fi connection would suggest that the user is within a public or unsecure setting. In one embodiment, the configuration of a Wi-Fi connection can also include an option to designate the device as located within a private setting when the device is connected to that Wi-Fi connection. However, it will be appreciated that being connected to the Wi-Fi connection may not be dispositive of the privacy or security context, as visitors may be present at the user's home or office. The other sensors and inputs of the device may provide a more robust determination of the privacy or security context. In some embodiments, the privacy or security context of the device can also be determined in part by the NFC, RF, IR, or Bluetooth® components of the device. For instance, a device may be configured to connect to a user's vehicle via Bluetooth® and the device being connected to the user's vehicle may be a strong indication that the user is within a private setting. In one embodiment, the configuration of a Bluetooth® connection may include an option to designate the device as located within a private setting when the device is connected to that Bluetooth® connection.

Figure 4A:
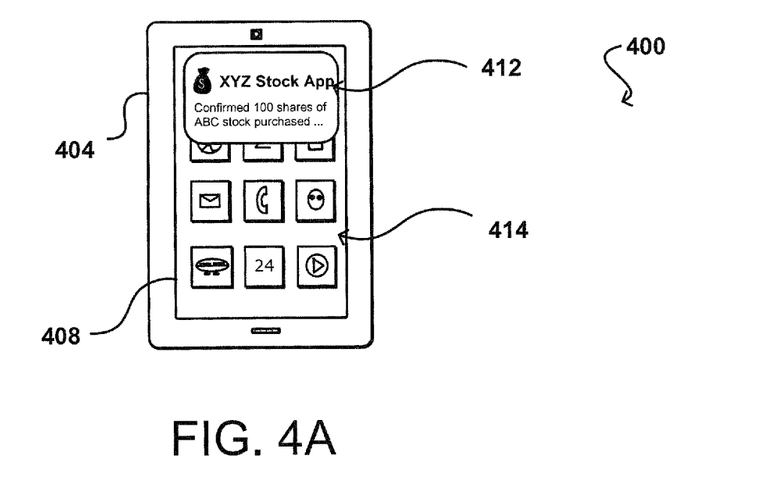
FIGS. 4A and 4B illustrate an example approach for providing privacy or security controls adaptive to the device's privacy or security context in accordance with an embodiment.
Figure 4B:
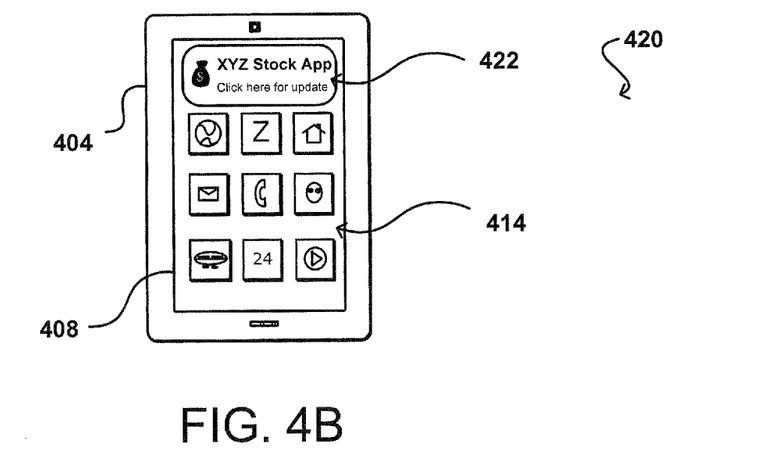

FIGS. 4A and 4B illustrate a computing device 404 implementing a security or privacy control adaptive to a determined privacy or security context of the device. In the example situation 400, the device 404 is displaying a home screen 414, a graphical user interface comprising user application icons corresponding to user applications that can be activated upon selection by the user. The device 404 has determined that the user is within a private or secure setting. At a certain moment of time, the device 404 receives a notification, which is displayed as a banner 412 on touchscreen 408. Notifications are a feature of many operating systems that allow a user application or operating system to keep a user informed about events relating to the application or operating system. Notifications are often employed by communication-related user applications, such as a telephony application, voicemail, email, Short Message Service (SMS) text messaging, instant messaging, or social networking, wherein an application provider will send a user a notification in response to a new communication. Notifications are also commonly utilized by applications that publish frequently updated content, such as news, weather, stock market, or sports applications, Rich Site Summary (RSS) feeds, blogs, or social networking applications. Notifications can also be used by online banking or other financial applications to report the financial transactions made to the user's account, games to apprise the user of events in the gaming world, scheduling and calendar applications to remind the user of upcoming events, etc. An operating system and user applications may also use notifications to inform the user of software updates or system status. In this example situation 400, the banner notification 412 is received to the computing device 404 and displayed for a brief period of time before ceasing to be displayed. Selection of the banner notification within this window of time may invoke the user application (or bring the user application to the foreground if the user application is currently running in the background). The banner notification 412 also includes a brief message previewing some of the content that may be displayed upon invoking the user application.

FIG. 4B illustrates an example situation 420 wherein the computing device 404 is determined to be located within a public setting when the device receives a notification. The notification is displayed as a banner 422 on touchscreen 408. Whereas the banner notification 412 in FIG. 4A included a brief message that included potentially sensitive information, that information is withheld here, where the device 404 is determined to be in a public setting. In other embodiments, notifications may be limited to "badges" when the device is determined to be in a public setting. A "badge notification" can refer to a counter that is displayed alongside an application icon that may indicate to the user a number of events occurring since the user last interacted with the application, a number of actions required to be taken by the user, a number of unread communications, and the like. In still other embodiments, notifications may be buffered and displayed only after the device is determined to be situated within a private or secure setting. A manner of presentation of a notification can be based on the determined privacy or security context and/or the sensitivity of the content being presented.

In some embodiments, a screen lock of a device can be modified based on the determined privacy or security context. Conventional devices typically trigger a screen lock after a period of inactivity, and require the user to enter a pin or password to re-obtain access to the operating system of the device. In one embodiment, the period of time of inactivity to trigger the screen lock can be greater when the device is determined to be within a private or secure setting than when the device is determined to be within a public or unsecure setting. In another embodiment, the screen lock can be eschewed altogether when the device is determined to be located within a private setting.

In some embodiments, a home screen of the computing device can be modified based on the determined privacy or security context of the device. In one embodiment, when the device is determined to be in a public setting, certain user applications, bookmarks, or files (e.g., documents, photographs, media files, etc.) accessible from the home screen can be hidden. When the device is determined to be within a private setting, those applications, bookmarks, or files can be displayed. In another embodiment, the device can be configured to display a different background photograph or image according to the privacy or security context. For example, a personal photograph can be displayed as the background of the home screen when the device is located within a private setting and a different image can be displayed as the background of the home screen when the device is located within a public setting.

In various embodiments, user applications can also implement appropriate privacy or security controls based on the determined privacy or security context of the device. A device can include an application programming interface (API) that exposes the determined privacy or security context to user applications, and the user applications can modify user experiences according to the determined privacy or security context. For example, email applications typically display a portion of an email message to assist the user in quickly assessing whether to review the entire message. While such an approach can enhance the user experience, sensitive and/or confidential information can also be inadvertently exposed if the user opens the email application in a public setting. Thus, the email application can be configured to withhold or hide the message content, the subject line, and/or the sender when the device is determined to be in a public setting. It will be appreciated that in those embodiments with multiple privacy or security contexts, more (or less) information can be presented based on the determined context. For example, in one embodiment with multiple privacy contexts, all preview content of an email can be displayed for the most secure context; the sender and subject line can be displayed in a less secure context, and only the sender may be displayed in an even less secure context. A similar approach of eliding preview content can also be implemented by text messaging, instant messaging, visual voicemail, and social networking applications. As another example, the email application may include email from multiple accounts, including personal and business email accounts. The email application can default to a particular designated email account based on the privacy or security context, such as a personal account when the device is determined to be in a public setting and a business account when the device is determined to be in a private setting. Open email messages for sensitive and/or confidential email accounts can also be automatically closed when the device is determined to be situated in a public setting.

Figure 5:
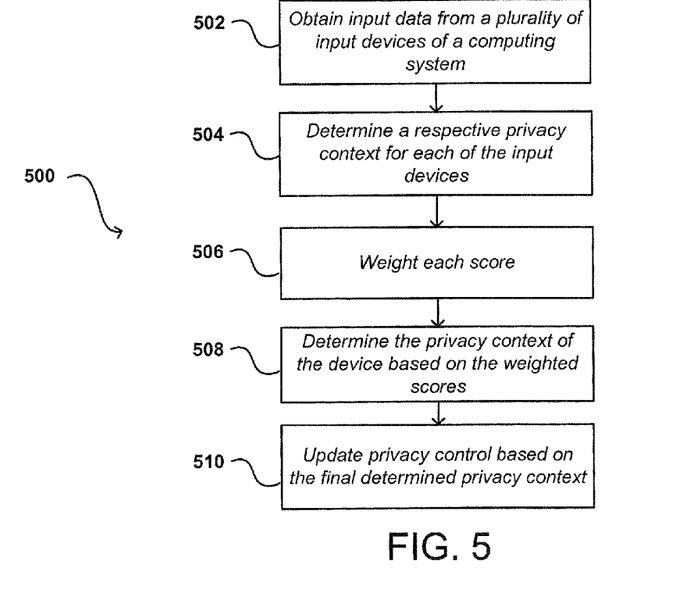
FIG. 5 illustrates an example process for determining a privacy or security context of a computing device and providing privacy or security controls adaptive to the device's privacy or security context in accordance with an embodiment.
Figure 6:
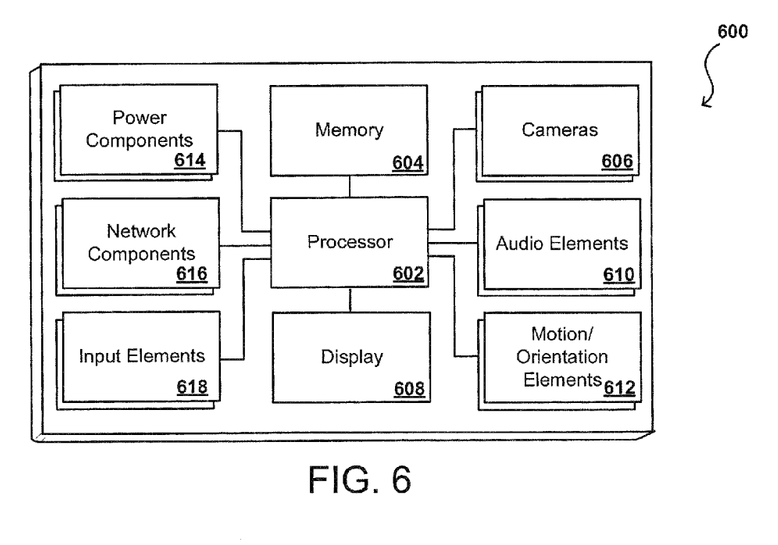
FIG. 6 illustrates an example configuration of components of a computing device such as that illustrated in FIG. 1A, 1B, 2, 3, 4A, or 4B.

FIG. 5 illustrates an example process for determining a privacy or security context of a computing system and updating privacy or security controls adaptive to the system's privacy or security context in accordance with an embodiment. It should be understood that, for any process discussed herein, there can be additional, fewer, or alternative steps performed in similar or alternative orders, or in parallel, within the scope of the various embodiments unless otherwise stated. In this example, the process is initiated in response to user attempting to access a computing system after a screen lock has been triggered or the system has been powered on. In some embodiments, the process may also be initiated in response to the user changing locations, such as 25 feet or a margin of error of the GPS receiver of the computing system. In other embodiments, the privacy or security context can be determined based on a first access to confidential data for a period of time. In still other embodiments, the privacy or security context can be determined at certain intervals, such as every minute, 10 minutes, hour, or other intervals of time. The process begins by obtaining input data from a plurality of input devices of the computing system 502, such as the GPS receiver, one or more cameras, one more microphones, one or more ambient light sensors, and the other sensors and input devices disclosed herein and known to those of ordinary skill in the art. The input data of each of the input devices can be analyzed to determine a preliminary privacy or security context 504, such as whether the device is situated in a public setting or a private setting. In other embodiments, the privacy or security context may comprise more than two states. Each of the privacy or security contexts can be weighted 506 according to the confidence level, sensitivity, accuracy, specificity, error rate, ROC, or other similar metric of the sensor or input, the extent to which the sensor or input reliably determines the privacy or security context of the device, and the other factors discussed herein. The final privacy or security context can be determined by selecting a privacy or security context determined by one input approach to be optimal, such as an input corresponding to the highest confidence level or the lowest error rate. Alternatively, the weighted scores may be aggregated to determine the privacy or security context of the device 508. After determination of the final privacy or security context, a security or privacy control can be updated 510 to reflect the determined privacy or security context, such as modifying how a user may enter a pin or password to access the device or a manner of displaying the pin or password during entry, a manner of presenting notifications to be displayed by the computing device, presentation of one or more elements of a home screen (e.g., background photograph or image, applications, files, etc.), presentation of one or more elements of user applications (e.g., previews of emails, text messages, instant messages, visual voice mail, etc.), or other privacy and controls discussed throughout herein. In some embodiments, a confidence level can also be determined for the final privacy or security context. If the confidence level is below a threshold confidence level, then more rigorous privacy or security settings can be applied. In other embodiments, the determined privacy context and confidence level can be used by a user application to adapt how a user may interact with the application FIG. 6 illustrates a logical arrangement of a set of general components of an example computing device 600 such as the device 104 described with respect to FIGS. 1A and 1B, device 204 described with respect to FIG. 2, device 304 described with respect to FIG. 3, or device 404 described with respect to FIGS. 4A and 4B. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 608, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As mentioned, the device in many embodiments will include one or more cameras or image sensors 606 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 600 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 614 known in the art for providing power to a computing device, which can include capacitive charging elements for use with a power pad or similar device. The computing device can include one or more communication elements or networking sub-systems 616, such as a Wi-Fi, Bluetooth®, RF, wired, or wireless communication system. The device in many embodiments can communicate with a network, such as the Internet, and may be able to communicate with other such devices. In some embodiments the device can include at least one additional input device 618 able to receive conventional input from a user. This conventional input can include, for example, a push button, touch pad, touchscreen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 600 also can include one or more orientation and/or motion sensors 612. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 602, whereby the device can perform any of a number of actions described or suggested herein.

In some embodiments, the device 600 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 600 may include a ambient light sensor that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 600 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
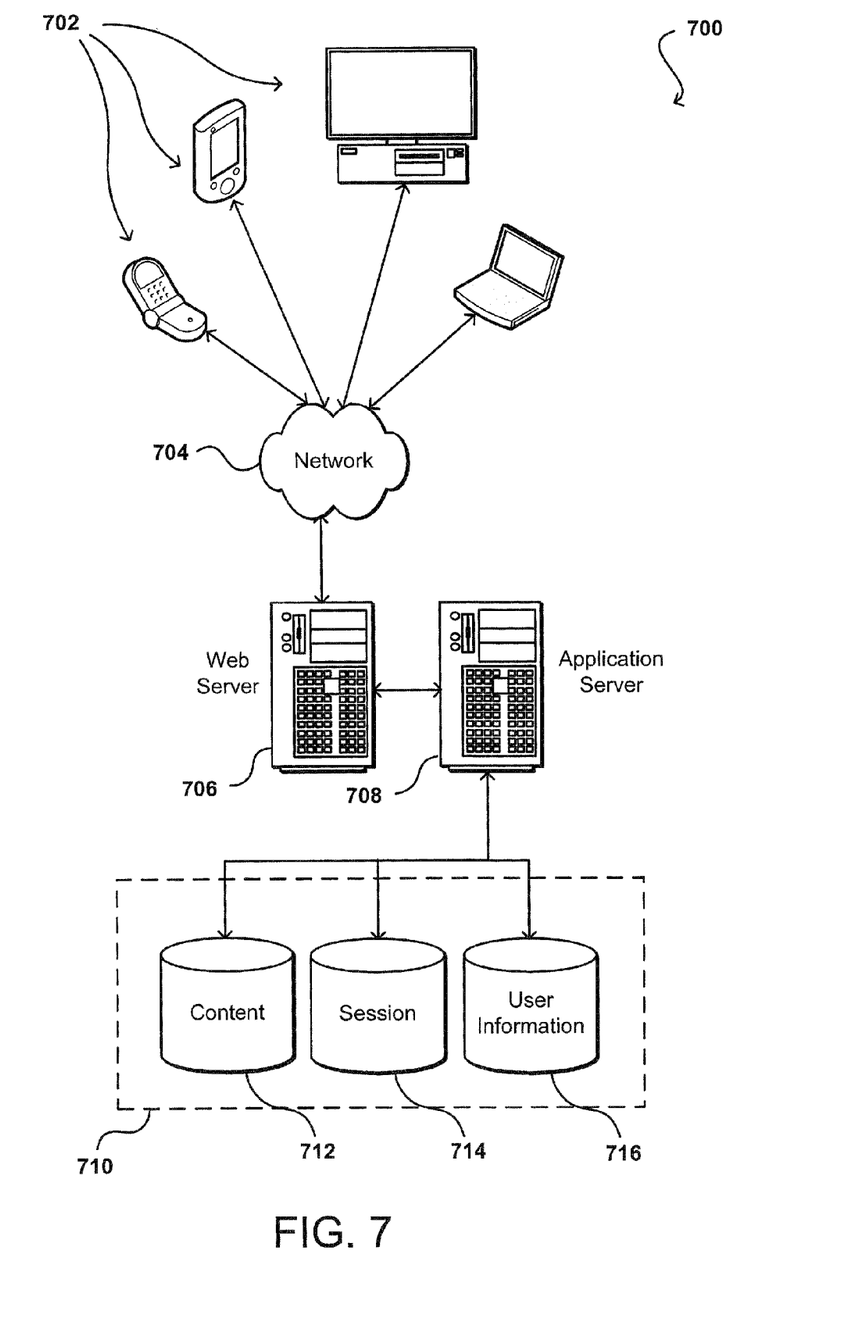
FIG. 7 illustrates an example environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   one or more processors;
   a display screen;
   a global positioning system (GPS) receiver;
   one or more cameras;
   one or more microphones;
   memory including instructions that, when executed by the one or more processors, cause the computing device to:
   obtain a first privacy context of the computing device;
   determine a first preliminary privacy context based at least in part upon a location of the computing device detected by the GPS receiver;
   determine a second preliminary privacy context based at least in part upon a first number of persons detected in image data captured by the one or more cameras;
   determine a third preliminary privacy context based at least in part upon a second number of persons detected in audio data captured by the one or more microphones;
   determine a second privacy context of an environment in which the computing device is situated based on at least one of the first preliminary privacy context, the second preliminary privacy context, or the third preliminary privacy context; and
   update at least one privacy control of the computing device based at least in part upon the second privacy context being different from the first privacy context.

2. The computing device of claim 1, wherein the instructions when executed to cause the computing device to determine the first preliminary privacy context include causing the computing device to:
   obtain the location of the computing device detected by the GPS receiver; and
   determine whether the location corresponds to a private location for a user,
   wherein the first preliminary privacy context corresponds to a private setting when the location is determined to be the private location for the user and the first preliminary privacy context corresponds to a public setting when the location is determined not to be the private location for the user.

3. The computing device of claim 1, wherein the instructions when executed to cause the computing device to determine the second preliminary privacy context include causing the computing device to:
   capture the image data using the one or more cameras;
   analyze the image data using a facial detection process; and
   determine the first number of persons detected in the image data by a number of different faces detected in the image data using the facial detection process,
   wherein the second preliminary privacy context corresponds to a public setting when the first number of persons detected in the image data is greater than one and the second preliminary privacy context corresponds to a private setting when the first number of persons detected in the image data is one or less.

4. The computing device of claim 1, wherein the instructions when executed to cause the computing device to determine the third preliminary privacy context include causing the computing device to:
   capture the audio data using the one or more microphones;
   analyze the audio data using a speech detection process; and
   determine the second number of persons detected in the audio data by a number of different speakers detected in the audio data using the speech detection process,
   wherein the third preliminary privacy context corresponds to a public setting when the second number of persons detected in the audio data is greater than one and the third preliminary privacy context corresponds to a private setting when the second number of persons detected in the audio data is one or less.

5. The computing device of claim 1, wherein the instructions when executed to cause the computing device to determine the second privacy context include causing the computing device to:
   determine a first confidence level corresponding to the first preliminary privacy context, a second confidence level corresponding to the second preliminary privacy context, and a third confidence level corresponding to the third preliminary privacy context;
   weight the first preliminary privacy context based at least in part upon the first confidence level to generate a weighted first preliminary privacy context, the second preliminary privacy context based at least in part upon the second confidence level to generate a weighted second preliminary privacy context, and the third preliminary privacy context based at least in upon the third confidence level to generate a weighted third preliminary privacy context; and
   determine the second privacy context based at least in part upon combining the weighted first preliminary privacy context, the weighted second preliminary privacy context, and the weighted third preliminary privacy context.

6. The computing device of claim 1, wherein the instructions when executed to cause the computing device to update the at least one privacy control include causing the computing device to:

display at least a latest entered key of a password during entry of the password when a current privacy context corresponds to a private setting; and obscure at least one key of the password during entry of the password when the current privacy context corresponds to a public setting.

7. A computer-implemented method, comprising:

obtaining an initial privacy context of a computing system;

obtaining first input data corresponding to a location of the computing system from a first input device of the computing system, second input data corresponding to a number of persons detected by a second input device of the computing system, and third input data from a third input device of the computing system, the first input device comprising at least one of a GPS receiver or an ambient light sensor, the second input device comprising at least one of a camera or a microphone;

determining a first preliminary privacy context according to the first input data, a second preliminary privacy context according to the second input data, and a third preliminary privacy context according to the third input data;

determining a final privacy context of the computing system based on at least one of the first preliminary privacy context, the second preliminary privacy context, or the third preliminary privacy context; and updating at least one privacy control of the computing system based at least in part upon the final privacy context differing from the initial privacy context.

8. The computer-implemented method of claim 7, wherein:

the first input device is the GPS receiver;

the first input data includes the location of the computing system detected by the GPS receiver;

determining the first preliminary privacy context according to the first input data includes determining that the location corresponds to a private location for a user of the computing system; and the final privacy context corresponds to a private setting.

9. The computer-implemented method of claim 7, wherein:

the second input device is the camera;

the second input data includes image data captured by the camera;

determining the second preliminary context according to the second input data includes determining that the number of persons represented in the image data is greater than one; and the final privacy context corresponds to a public setting.

10. The computer-implemented method of claim 7, wherein:

the second input device is the microphone;

the second input data includes audio data captured by the microphone;

determining the second preliminary context according to the second input data includes detecting that the number of persons speaking in the audio data is greater than one; and the final privacy context corresponds to a public setting.

11. The computer-implemented method of claim 7, wherein:

the first input device is the ambient light sensor;

the first input data includes an amount of ambient light detected by the ambient light sensor;

determining the first preliminary context according to the first input data includes determining that the amount of ambient light is associated with indoor conditions; and the final privacy context corresponds to a private setting.

12. The computer-implemented method of claim 7, wherein determining the final privacy context includes:

determining a first confidence level corresponding to the first preliminary privacy context, a second confidence level corresponding to the second preliminary privacy context, and a third confidence level corresponding to the third preliminary privacy context;

weighting the first preliminary privacy context based at least in part upon the first confidence level to generate a weighted first preliminary privacy context, the second preliminary privacy context based at least in part upon the second confidence level to generate a weighted second preliminary privacy context, and the third preliminary privacy context based at least in part upon the third confidence level to generated a weighted third preliminary privacy context; and determining the final privacy context based at least in part upon combining the weighted first preliminary privacy context, the weighted second preliminary privacy context, and the weighted third preliminary privacy context.

13. The computer-implemented method of claim 12, wherein at least one of the first confidence level, the second confidence level, or the third confidence level is based on at least one of a sensitivity of a corresponding input device an accuracy of the corresponding input device, an error rate of the corresponding input device, a location of the computing system, user behavior data, or an environmental state in which the computing system is situated.

14. The computer-implemented method of claim 12, further comprising:

determining that a final confidence level, based on the first confidence level, the second confidence level, and the third confidence level, meets a threshold confidence level, wherein the final privacy context corresponds to a private setting.

15. The computer-implemented method of claim 7, wherein determining the final privacy context includes:

determining a first confidence level corresponding to the first preliminary privacy context, a second confidence level corresponding to the second preliminary privacy context, and a third confidence level corresponding to the third preliminary privacy context; and selecting one of the first preliminary privacy context, the second preliminary privacy context, or the third preliminary privacy context as the final privacy context based on a corresponding confidence level, of the one of the first preliminary privacy context, the second preliminary privacy context, or the third preliminary privacy context being a highest confidence level.

16. The computer-implemented method of claim 7, wherein the final privacy is further based at least in part upon additional input data received from a remote data service.

17. The computer-implemented method of claim 7, wherein updating the at least one privacy control includes:

displaying at least a first portion of a password during entry of the password or obscuring at least a second portion of the password during entry of the password based at least in part upon the final privacy context;

modifying a period of time corresponding to when a screen lock of the computing system is triggered due to inactivity based at least in part upon the final privacy context;

displaying one or more first elements of a home screen of the computing device or hiding the one or more first elements of the home screen of the computing device based at least in part upon the final privacy context; or displaying one or more second elements for at least one of a notification, an email application, a text messaging application, an instant messaging application, a visual voicemail application, or a social networking application or hiding the one or more second elements for the at least one of the notification, the email application, the text messaging application, the instant messaging application, the visual voicemail application, or the social networking application based at least in part upon the final privacy context.

18. A non-transitory computer-readable storage medium storing instructions, the instructions when executed by one or more processors causing the one or more processors to:

obtain an initial privacy context of a computing system;

obtain first input data corresponding to a location of the computing system from a first input device of a computing system, second input data corresponding to a number of persons detected by a second input device of the computing system, and third input data from a third input device of the computing system, the first input device comprising at least one of a GPS receiver or an ambient light sensor, the second input device comprising at least one of a camera or a microphone;

determine a first preliminary privacy context according to the first input data, a second preliminary privacy context according to the second input data, and a third preliminary privacy context according to the third input data;

determine a final privacy context of the computing system based on at least one of the first preliminary privacy context, the second preliminary privacy context, or the third preliminary privacy context; and update at least one privacy control of the computing system based at least in part upon the final privacy context differing from the initial privacy context.

19. The non-transitory computer-readable storage medium of claim 18, wherein the instructions when executed further cause the one or more processors to:

prompt a user whether to store the location as a private location for the user when the user accesses confidential data at the location a specified number of times.

20. The non-transitory computer-readable storage medium of claim 18, wherein the instructions when executed further cause the one or more processors to:

obtain at least one or more motions of the computing system, one or more user gestures, one or more touch or squeeze gestures, one or more sounds, biometric analysis, or behaviometric analysis for access to the computing system.

21. The computer-implemented method of claim 7, wherein:

the first input device is the ambient light sensor;

the first input data includes an amount of ambient light detected by the ambient light sensor;

determining the first preliminary context according to the first input data includes determining that the amount of ambient light is associated with outdoor conditions; and the final privacy context corresponds to a public setting.

22. The computer-implemented method of claim 12, further comprising:

determining that a final confidence level, based on the first confidence level, the second confidence level, and the third confidence level, is below a threshold confidence level;

wherein the final privacy context corresponds to a public setting.

* * * * *